(12) United States Patent
McLarty

(10) Patent No.: US 9,138,757 B2
(45) Date of Patent: Sep. 22, 2015

(54) PORTABLE IRRIGATION DEVICE AND METHOD OF USE

(71) Applicant: Harvey Wayne McLarty, Lubbock, TX (US)

(72) Inventor: Harvey Wayne McLarty, Lubbock, TX (US)

( * ) Notice: Subject to any disclaimer, the term of this patent is extended or adjusted under 35 U.S.C. 154(b) by 485 days.

(21) Appl. No.: 13/680,585

(22) Filed: Nov. 19, 2012

(65) Prior Publication Data
US 2013/0126643 A1    May 23, 2013

Related U.S. Application Data

(60) Provisional application No. 61/562,100, filed on Nov. 21, 2011.

(51) Int. Cl.
*A01G 25/02*    (2006.01)
*B05B 1/30*    (2006.01)
*B05B 15/06*    (2006.01)
*B05B 1/14*    (2006.01)
*B05B 1/20*    (2006.01)
*A01G 29/00*    (2006.01)
*A01G 27/02*    (2006.01)

(52) U.S. Cl.
CPC .............. *B05B 1/3006* (2013.01); *A01G 25/02* (2013.01); *A01G 25/023* (2013.01); *A01G 27/02* (2013.01); *A01G 29/00* (2013.01); *B05B 1/14* (2013.01); *B05B 1/20* (2013.01); *B05B 1/202* (2013.01); *B05B 1/207* (2013.01); *B05B 15/061* (2013.01); *B05B 15/063* (2013.01); *B05B 15/065* (2013.01); *B05B 15/069* (2013.01)

(58) Field of Classification Search
CPC .......... B05B 17/08; B05B 15/06; B05B 1/20; B05B 15/061; B05B 15/063; B05B 15/062; B05B 15/069; B05B 1/14; B05B 15/065; B05B 1/202; B05B 1/207; B05B 1/3006; A01G 29/00; A01G 13/0281; A01G 27/02; A01G 2025/006; A01G 25/023; A01G 25/02; A01M 7/005
USPC ............. 239/16, 17, 200, 266–269, 273, 275, 239/276, 279, 536, 542, 547, 548, 556–558, 239/560, 565, 600; 47/21.1, 48.5, 79
See application file for complete search history.

(56) References Cited

U.S. PATENT DOCUMENTS

| | | | | |
|---|---|---|---|---|
| 2,145,451 A | * | 1/1939 | McCoy | 239/547 |
| 2,563,300 A | * | 8/1951 | Aker | 239/547 |
| 2,909,328 A | * | 10/1959 | Babyak | 239/268 |

(Continued)

*Primary Examiner* — Steven J Ganey
(74) *Attorney, Agent, or Firm* — Sarah Hegi Simpson; McWhorter, Cobb & Johnson, LLP

(57) ABSTRACT

A portable irrigation device and a method of use are disclosed herein. The disclosed irrigation device generally comprises an adapter configured to be connected to a water source; a pressure regulation device connected to said adapter; segments of fluid supply tubing in fluid communication with said pressure regulation device and configured to form two approximately concentric circles, wherein said two circles form an outer circle and an inner circle, and wherein said outer circle is in fluid communication with said inner circle via one or more radial segments of fluid supply tubing connecting said outer circle to said inner circle; and a plurality of emitter elements disposed along said segments of fluid supply tubing at predetermined intervals. The disclosed irrigation device may be utilized to water any plant in need of targeted irrigation, including shallow-rooted plants such as flowers and dry areas of grass in lawns, as well as deep-rooted plants such as shrubs and trees.

14 Claims, 6 Drawing Sheets

(56) References Cited

U.S. PATENT DOCUMENTS

| | | |
|---|---|---|
| 3,917,174 A | 11/1975 | Hildebrandt |
| 3,966,233 A | 6/1976 | Diggs |
| D253,224 S | 10/1979 | Roehrich |
| D278,075 S | 3/1985 | Dryden |
| D278,076 S | 3/1985 | Dryden |
| 4,778,111 A | 10/1988 | Leap |
| D303,913 S | 10/1989 | Leap |
| D318,403 S | 7/1991 | Leap |
| 5,131,597 A | 7/1992 | Bard |
| 5,285,968 A | 2/1994 | McSheehy |
| 5,881,757 A | 3/1999 | Kuster |
| 6,023,883 A | 2/2000 | Bacon |
| 6,065,693 A | 5/2000 | Lukas |
| 6,540,436 B2 | 4/2003 | Ogi |
| 6,695,231 B2 | 2/2004 | Dramm |
| 6,779,744 B1 * | 8/2004 | Marine et al. .......... 239/536 |
| 6,901,698 B2 | 6/2005 | Manning |
| 7,213,771 B2 | 5/2007 | Chappell |
| 2008/0054096 A1 * | 3/2008 | Hibberd .......... 239/276 |

* cited by examiner

PORTABLE IRRIGATION DEVICE AND METHOD OF USE

CROSS-REFERENCE TO RELATED APPLICATIONS

This application is related to and claims priority from earlier filed U.S. Provisional Patent Application No. 61/562,100, filed Nov. 21, 2011.

BACKGROUND OF THE INVENTION

1. Field of the Invention

The present invention relates generally to an irrigation device and method of use. More specifically, the present invention relates to a portable irrigation device and method of use that provides for slow, efficient watering of plants and decreases water waste.

2. Description of the Prior Art

As water increasingly becomes a scarce resource and as many cities are forced to impose water restrictions due to drought conditions, water management and conservation have become even greater concerns in lawn care programs. Currently, many different devices are available for irrigating lawns, trees, shrubs, flower beds and various other plants. Design problems in current irrigation devices, however, present several disadvantages that are overcome by the present invention.

Conventional garden hoses, for example, may be used for watering flowers, trees, shrubs and the like. Such water hoses are made to be water impenetrable so that water does not leak from the hose as it passes from one end to the other, thereby serving as a conduit for conveying water from a water source to a specific plant. Using a garden hose to water plants, however, can be very time consuming and wasteful. The water saturates a small area around a plant at a rate that is too high to allow the soil and plant roots time to effectively absorb the water, resulting in evaporation and runoff of the standing water.

A soaker hose is another device regularly used in lawn care programs. Generally, soaker hoses are made of a flat or ribbon-like plastic tubing that has a series of small perforations on a top face thereof along the length of the hose. When connected to a water source, water seeps through the perforations in the hose to irrigate plants along the length of the hose. For proper operation, the soaker hose must remain in an upright position so that the perforations extend upwardly when laid on the ground. However, because they are made of a flexible, lightweight tubing, soaker hoses have a tendency to twist and kink. Twisted portions in the hose cause the water issuing from the twisted portions to spray in a different direction than desired, such as directly against the ground. Kinked portions in the hose reduce or completely shut off the flow of water to the portion of the hose downstream from the kink. To prevent a soaker hose from twisting or kinking, users oftentimes lay bricks or heavy weights on the soaker hose, or use ground stakes to attach the soaker hose to the ground. As a result, soaker hoses essentially become fixed in one place and cannot be easily moved or repositioned.

Another problem with soaker hoses occurs because the water source supplying the soaker hose is typically located two to three feet above the ground. This configuration, combined with the high water velocity and pressure at the water source, results in significantly over-watering the area closest to the water source and under-watering the area farthest from the water source.

As for lawn irrigation systems, one of the most popular has been the conventional lawn sprinkler. While manual, hose-fed sprinkler heads are inexpensive, such sprinklers must be manually moved throughout the lawn and are very time consuming to operate. On the other hand, automatic water sprinklers utilize a permanently installed network of underground piping and are much less time consuming to operate compared to manual water sprinklers. Automatic systems, however, are extremely expensive and are subject to high maintenance costs due to freezing damage, construction interference, damage during plant cultivation, rodent vandalism and damage to above ground sprinkler heads via lawn mowing equipment.

Many drawbacks of automatic and manual sprinkler systems are caused by the water delivery method used by these systems. Sprinkler heads deliver water to the general area of a plant, rather than specifically to the root system of the plant, and as a result, these devices require much more water and time to deliver water in sufficient quantities. Additionally, especially in hot, dry climates, water from sprinkler heads is highly susceptible to evaporation because water evaporates from droplets sprayed through the air before reaching the soil. Also, even a slight breeze can easily divert water sprayed through the air from its intended target. Plus, sloped areas of lawns are prone to discoloration because water from sprinklers runs off slopes before it has had time to be absorbed into the soil. Furthermore, as is well known in the art, sprinklers require spray overlap for uniform ground coverage. Sprinklers vary in distribution patterns, however, and oftentimes the spray does not overlap and misses certain corners or spots of a lawn resulting in dry and discolored patches of grass also known as "hot spots."

While the present invention is not intended to completely replace sprinkler systems for irrigating an entire grass lawn, the disclosed device is intended to be used in conjunction with sprinkler systems to overcome many of the above-described problems experienced with these systems.

Traditional lawn and turf irrigation systems, such as sprinkler systems, that are designed primarily for delivering irrigation water over the ground surface to irrigate grass and other shallow-rooted plants have generally proven to be inadequate for proper water delivery to deep-rooted plants such as trees and large shrubs. Particularly when planted in non-native or hostile environments, trees and shrubs may require special irrigation in order to achieve optimal health and growth. Light surface watering with traditional lawn and turf irrigation systems promotes shallow root systems and starves deeper roots, as roots develop where the surface water is available. This type of development leaves a tree at high risk of winter injury, summer heat stress, and wind damage.

On the other hand, over-watering, which often results from using a garden hose or a soaker hose left running near the base of a tree for a long period of time, is just as harmful as inadequate watering. While it is a common practice to water trees at the base of the trunk, frequently in a depression in the ground around the base, allowing the ground around a tree trunk and the trunk itself to be saturated with standing water, promotes disease, pests, and decay. Also, tree roots need oxygen to breathe. Excess moisture, however, pushes oxygen from the soil and a lack of oxygen harms and can eventually kill tree roots.

In an effort to provide improved delivery of irrigation water to deep subsurface roots of large plants such as trees, a variety of specialized deep-root watering devices and systems have been developed. Deep-root watering systems include devices that extend downwardly into the ground in close proximity to the roots of an adjacent plant such as a tree. These devices utilize one or more porous sleeves, cylinders, stakes or the like, installed beneath the ground surface in relatively close proximity to the roots of an adjacent plant. Irrigation water can be delivered manually to the interior of the porous device from a bucket, garden hose, etc., or automatically on a scheduled basis by means of an irrigation device mounted within the porous device. The irrigation water permeates through the porous device in an attempt to reach the deep subsurface plant roots.

Unfortunately, there are many problems with this method for watering deep subsurface plant roots. Such watering devices and systems can be very expensive and installation is typically difficult and time consuming. To install deep-root watering stakes, for example, users are generally required to use a hammer or similar device to insert the stakes into the ground. In order to insert the stakes into hard ground, users may have to use a sledge hammer or an auger bit to pound or force the stake into the ground. Not surprisingly, in the process of installing deep-root watering systems, users often inadvertently damage underground lines or pipes. Also, as plant roots enlarge, they may cause harm to these underground watering devices.

Furthermore, deep-root watering with a porous device thrust into the soil is not as good for trees and other deep-rooted plants as surface applications. Since most of the absorbing roots of trees are in the top approximately twelve inches of the soil, water should be applied across the soil surface and allowed to slowly soak into the soil. Surface soaking allows tree roots more chances to absorb water, helps maintain soil health, and helps maintain essential element cycling and transformations in the soil. Applying water below the surface misses the active roots and allows water to drain away from the roots, wasting valuable water resources.

Finally, as water becomes more expensive, the use of drip irrigation in lawn care programs has increased in popularity. Drip irrigation is an irrigation method that uses a minimum amount of water to irrigate plants. Drip irrigation lines, such as those made of plastic pipes or tubing, are fitted with periodic emitters for delivering water to plant root areas. Emitters discharge a small volume of water per unit time to allow the soil to fully absorb the water. Users try to position emitters to deliver water slowly and directly to the root zone of specific plants in a landscape or garden.

While drip irrigation conserves water by applying water directly to the soil, thereby decreasing water waste from drift, evaporation or runoff, design problems in current drip irrigation systems present several problems. Similar to some of the problems experienced with soaker hoses, the long lengths of drip irrigation lines, such as those made from plastic tubing, have a tendency to kink, which shuts off the flow of water to the tubing downstream from the kink. To prevent kinking and in order to keep the tubing in a fixed position on the ground, users typically use ground stakes or the like to attach the tubing to the ground. As a result, the tubing essentially becomes fixed in one place and cannot be easily moved or repositioned.

This immobility of current drip irrigation systems causes many problems. For example, tubing left out in the sun has a shortened usable life because the ultraviolet rays of the sun cause the tubing to become brittle and crack or break. Also, while a new plant may require only one emitter initially, as the plant grows, so does its demand for water. Therefore, the drip irrigation system needs to be movable so that additional emitters can be directed towards growing plants as needed. Also, oftentimes after installing a new drip irrigation system, a user finds that certain plants or segments of the lawn or garden are being under-watered whereas other areas are being over-watered. However, due to the immobility of current systems, it is difficult and time-consuming to reposition or relocate the tubing to fix the uneven watering problems.

Another problem with drip irrigation systems is its unsightly appearance when left uncovered on the ground surface. As a result, the tubing is often buried or covered by mulch or plant foliage, making it even more immobile and making it difficult to monitor the effectiveness of the system. Buried or covered tubing is susceptible to blocked or clogged emitters, root intrusion, and harm from wayward lawn mowers, other lawn tools or rodents. Uncovered tubing, on the other hand, becomes easy prey for pets, kids, and even vandalism in public locations.

Additionally, users face many problems when trying to use drip irrigation lines to water large plants such as trees. Not only is it unfeasible to use drip irrigation lines for watering trees for the reasons listed above, but also, drip irrigation lines typically do not provide a sufficient supply of water to the entire root area of large trees.

Currently, a need exists for an irrigation device that conserves water and that is simple and time efficient to operate. An irrigation device is needed that is both lightweight and that is configured to remain in a desired position during use without requiring heavy objects or stakes to anchor it to the ground. A device is needed that can be easily repositioned or moved to another location and that can be stored away when not in use. An irrigation device is needed that is inexpensive and simple to manufacture. Further, a device is needed that delivers water directly to the root zone of plants in a manner that decreases the likelihood that water will be wasted due to evaporation, wind and runoff. There is a need for an irrigation device that can effectively water shallow-rooted plants, including reviving dry and discolored "hot spots" in lawns, and that can be used to effectively water deep-rooted plants such as trees and shrubs. Unlike existing irrigation devices that often over-water or under-water desired areas, a need exists for a device that delivers a slow, controlled and even distribution of water to a targeted area.

In view of the foregoing, it is apparent that a need exists in the art for a portable irrigation device which overcomes, mitigates or solves the above problems in the art. It is a purpose of this invention to fulfill this and other needs in the art which will become more apparent to the skilled artisan once given the following disclosure.

OBJECTS AND SUMMARY OF THE INVENTION

It is an object of the present invention to overcome the above described drawbacks associated with current devices. To achieve these and other advantages and in accordance with the purpose of the invention, as embodied and broadly described, the present disclosure describes a portable irrigation device that provides for slow, efficient watering of plants and decreases water waste.

By utilizing a pressure-regulated, controlled watering method that targets water to problematic areas, the disclosed device can help plants recover from heat stress and drought. The device generally comprises an adapter configured to be connected to a water source; a pressure regulation device connected to said adapter; segments of fluid supply tubing in fluid communication with said pressure regulation device and configured to form two approximately concentric circles, wherein said two circles form an outer circle and an inner circle and wherein said outer circle is in fluid communication with said inner circle via one or more radial segments of fluid supply tubing connecting said outer circle to said inner circle;

and a plurality of emitter elements disposed along said segments of fluid supply tubing at predetermined intervals.

The fluid supply tubing is made out of a flexible material, such as plastic. Segments of the tubing are joined together and arranged as at least two approximately concentric circles connected to one another by one or more radial segments of tubing. The segments of fluid supply tubing are connected in such a way that all the segments are in fluid communication with one another. This configuration provides many advantages over current irrigation devices.

Unlike many existing irrigation devices, the present device is designed to be lightweight and compact for easy portability and storage. As a result, the device may be easily stored to avoid damage from the sun, pets, kids, rodents, lawn mowers, etc.

Additionally, even though the device is lightweight, the configuration of the device keeps the device in a fixed position during use or non-use without requiring heavy objects or stakes to anchor the device to the ground. Also, the configuration of the device makes twisting or kinking of the tubing virtually impossible.

A further advantage is that the configuration of the device allows a constant and controlled stream of water to be evenly distributed throughout the device and to the soil below. Current devices that use long lines of pipe, hose or tubing, experience water pressure differences from the beginning of the line closest to the water source compared to the end of the line farthest from the water source. Such devices connect to a water source in a manner that provides for a unidirectional flow of water. If a line becomes obstructed or blocked by debris or other foreign materials in the line, the flow of water is shut off to the line downstream from the obstruction or blockage. The configuration of the disclosed device overcomes this problem and provides for a two-directional flow of water and a constant water pressure throughout the device.

Unlike many watering devices that are unduly complex and add unnecessary cost to the devices, the disclosed device has a simple design allowing it to be manufactured and sold at relatively inexpensive prices compared to many current irrigation devices. Plus, the low-cost device disclosed herein is simple to use and does not require a complex installation process. The device works simply by connecting it to a water source, such as a standard garden hose connected to an outdoor water faucet.

The disclosed device may be utilized to water any plant in need of targeted irrigation including shallow-rooted plants such as flowers and "hot spots" in lawns, as well as deep-rooted plants such as shrubs and trees. The configuration of the disclosed device allows for deeper, more concentrated watering compared to current devices. The device delivers a slow, precise application of water directly to the root zones of plants in a predetermined pattern allowing water to be absorbed slowly into the soil and directly into the root zone of nearby plants, which minimizes the loss of water to runoff, wind and evaporation.

As is well known in the art, it is desirable to water trees slowly to allow water to soak into the ground for absorption by the roots of the trees. The present device provides for such a tree watering method. Users can simply place the device either around the trunk of a tree, or move the device beneath the dripline of a large tree or a grouping of trees in three approximately evenly-spaced areas beneath the dripline. By dispersing water across the top of the soil surface, the disclosed device allows the absorbing roots of trees to absorb the water, helps maintain soil health, and helps maintain essential element cycling and transformations in the soil. Also, watering only the roots of trees cuts down on water-borne pests and fungal diseases that spread by water movement.

When watering trees at a high flow rate, such as with a garden hose, water is unable to soak into the soil, resulting in the surface of the ground becoming supersaturated and causing run-off and waste of the excess water. Substantial water and nutrient savings are realized when using the disclosed device because runoff and over-watering are greatly reduced or eliminated. The disclosed device comprises a pressure regulator as well as pressure regulating emitter elements to provide a controlled, slow and even application of water around trees, allowing the water to be absorbed slowly into the soil so that less water is used with better efficiency compared to application of water from prior devices. The disclosed irrigation method allows water to move deeper into the soil, encouraging deeper root growth.

Furthermore, tree roots compete with grass roots for water, which may result in dry and discolored grass in certain areas of a lawn. To prevent dry and discolored spots in the grass, the competitive areas need to be watered more often and more heavily than simply watering with an automatic sprinkler system. Likewise, walls and hot pavement can reflect the sun's heat onto nearby grass causing it to dry and discolor. Plus, in lawns with automatic sprinkler systems, certain areas of the lawn are often missed by sprinklers and become dry and discolored. The disclosed device can be placed directly on such "hot spots" to quickly replace lost moisture and keep both the grass and trees green and healthy.

Another advantage of the presently disclosed device is that the device is not affected by difficult terrains (e.g., slopes, oddly shaped areas, or windy sites) or by high water pressures emerging from a water source. The flow rate of water issuing from the device is controlled by the pressure regulation device and emitter elements. With the disclosed irrigation device sitting approximately level with the ground, the emitter elements spray water along the fluid supply tubing, such that the water slowly drips down from the tubing to the soil and spreads throughout the soil via capillary action. This provides for a slow, controlled and uniform watering of the area beneath and surrounding the device, without inadvertently omitting desired areas and without losing water to runoff, wind or evaporation. As for oddly-shaped areas of grass or plants that are not reached by a sprinkler system and that are included in many landscapes, the disclosed device may be used to easily water such areas by simply placing the device directly on top of such areas.

These, together with other objects of the invention, along with various features of novelty that characterize the invention, are pointed out with particularity in the claims annexed hereto and forming a part of this disclosure. For a better understanding of the invention, its operating advantages, and the specific objects attained by its uses, reference should be had to the accompanying drawings and descriptive matter in which there is described illustrative embodiments of the invention.

BRIEF DESCRIPTION OF THE DRAWINGS

The accompanying drawings, which are incorporated in and form a part of the specification, illustrate embodiments of the present invention, and together with the description, serve to explain the principles of the invention. It is to be expressly understood that the drawings are for the purpose of illustration and description only and are not intended as a definition of the limits of the invention. In the drawings.

DETAILED DESCRIPTION OF ILLUSTRATIVE EMBODIMENTS

Referring now to FIGS. 1-7, exemplary embodiments of a portable irrigation device 10 and methods of use in accordance with the present disclosure are illustrated.

Figure 1:
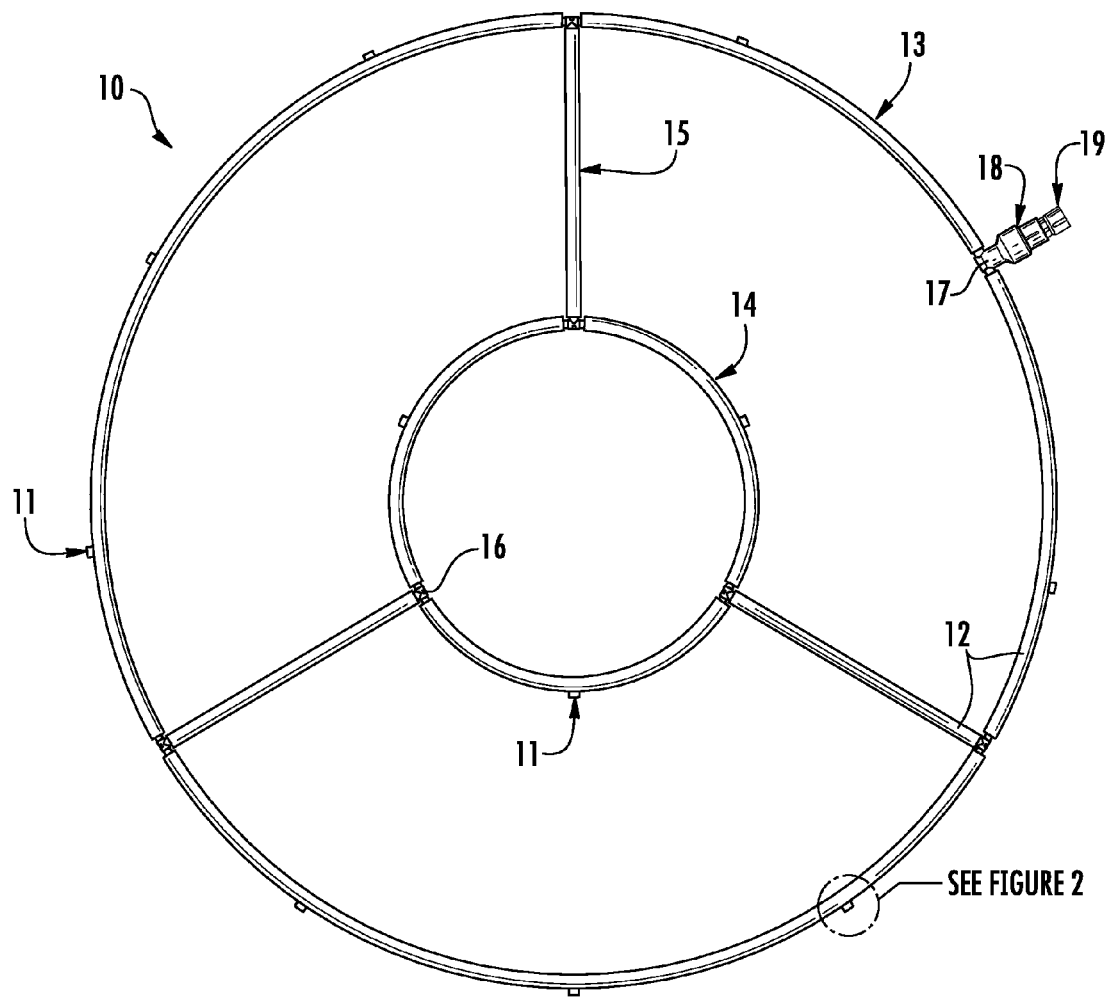
FIG. 1 is a plan view of a device constructed in accordance with the teachings of the present disclosure.

Turning to FIG. 1, a portable irrigation device 10 according to the present disclosure is illustrated and generally includes an adapter 19 configured to be connected to a water source 23; a pressure regulation device 18 connected to said adapter 19; segments of fluid supply tubing 12 configured to be in fluid communication with said pressure regulation device 18, said tubing 12 being configured to form two approximately concentric circles 13 & 14, wherein said two circles form an outer circle 13 and an inner circle 14 and wherein said outer circle 13 is configured to be in fluid communication with said inner circle 14 via one or more radial segments 15 of fluid supply tubing 12 connecting said outer circle 13 to said inner circle 14; and a plurality of emitter elements 11 disposed along said segments of fluid supply tubing 12 at predetermined intervals.

The irrigation system according to the present disclosure includes a water source 23 and at least one irrigation device 10, which is configured to be connected to the water source. The water source, for example, can be a standard garden hose connected to a faucet of a residence or building, a connection with a water well, or any other suitable or convenient water source.

Figure 6:
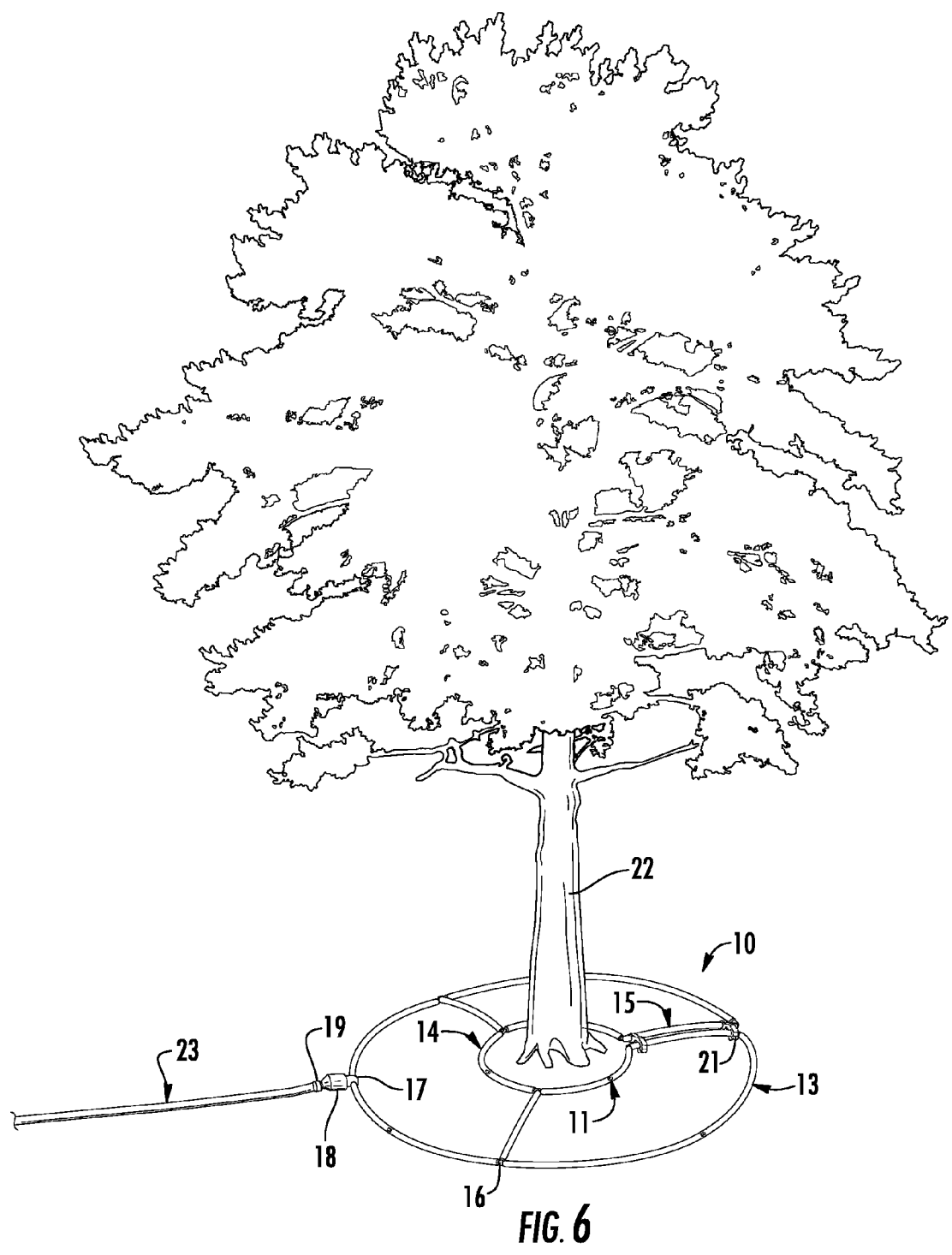
FIG. 6 is a perspective view of the device shown in FIG. 3 encircling a tree trunk and connected to a water source, with the device in a closed position.
Figure 7:
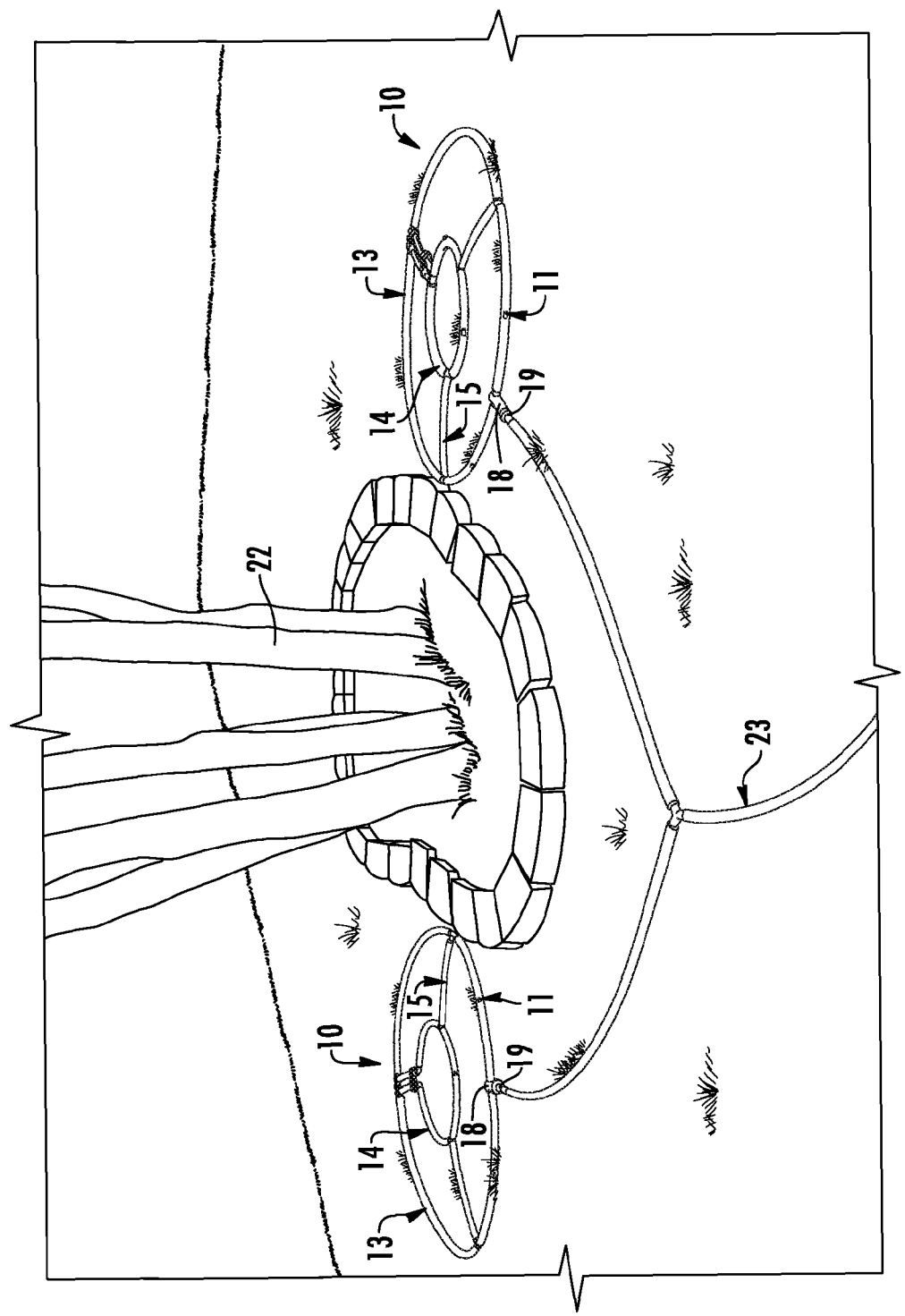
FIG. 7 is a perspective view of two of the devices shown in FIG. 3 connected to a single water source.

In the embodiments shown in FIGS. 6 and 7, a standard water hose 23 connected to a water source delivers water to at least one irrigation device 10 according to the present disclosure. The water hose 23 can be provided with a male type or female type hose connector to couple respectively with a female type or male type hose adapter 19 of the disclosed irrigation device 10. Preferably, the water hose 23 is made of a hose material impermeable to water. In this manner, water is conveyed from the water source to the irrigation device 10 without any water loss therebetween.

As illustrated in FIGS. 6 and 7, a pressure regulation device 18 is connected to the adapter 19 and is disposed between the water source 23 and the fluid supply tubing 12. Since the quantity of water discharged from the water source over any given period of time varies in relation to the variations in pressure from the water source, a pressure regulation device 18 is used to keep the water pressure at a constant level within the disclosed device 10, to reduce the incoming water pressure from the water source 23, and to prevent supersaturating the soil as a result of high water pressures.

Typically, water pressures vary widely from home to home. For example, an average household water pressure varies between 30-60 pounds per square inch (psi). The disclosed irrigation device 10 operates best at water pressures that are lower than the average household water pressures. In one embodiment of the disclosed irrigation device 10, it uses a 10 psi pressure regulation device 18 such as the apparatus disclosed in U.S. Pat. No. 5,881,757, by Kuster et al., entitled "Pressure Regulator Apparatus and Method," dated Mar. 16, 1999. Those skilled in the art will recognize that many types of pressure regulation devices 18 may be utilized with the disclosed device 10, as the various embodiments of the present invention are not limited to the use of any particular pressure regulation device.

The pressure regulation device 18 is configured to be in fluid communication with the segments of fluid supply tubing 12. In the embodiment shown in the attached Figures, a hollow T-shaped barbed connector 17 is used for connecting the pressure regulation device 18 to the fluid supply tubing 12 of the irrigation device 10. The T-shaped connector 17 splits the unidirectional flow of water from the water source 23 into a two-directional flow of water issuing from the two outlets of the T-shaped connector 17 to the segments of fluid supply tubing 12. This two-directional flow of water helps establish a constant water pressure throughout the device 10 and helps prevent blockage of the water flow to a portion of the device 10. One skilled in the art can appreciate that there are many other possibilities that exist for connecting the pressure regulation device 18 to the fluid supply tubing 12, all of which are considered to be within the spirit and scope of the present invention.

The accompanying Figures depict segments of fluid supply tubing 12 configured to form two approximately concentric circles 13 & 14. The two circles form an outer circle 13 and an inner circle 14. The outer circle 13 is configured to be in fluid communication with the inner circle 14 via one or more radial segments 15 of fluid supply tubing connecting the outer circle 13 to the inner circle 14. In the embodiment depicted in FIG. 1, three radial segments 15 of fluid supply tubing are used to fluidly connect the outer circle 13 to the inner circle 14; however, other embodiments are contemplated wherein greater or lesser numbers of radial segments 15 of fluid supply tubing are utilized to fluidly connect the outer circle 13 to the inner circle 14. Moreover, in the attached Figures, the segments of fluid supply tubing 12 are arranged in the shape of two approximately concentric circles 13 & 14; however, other embodiments are contemplated wherein more than two approximately concentric circles are utilized for providing irrigation water to plants as disclosed herein.

The fluid supply tubing 12 is preferably made of a flexible, non-porous material. In one of the embodiments contemplated by the present disclosure, the fluid supply tubing 12 is made of ½-inch diameter polyethylene tubing. In alternative embodiments, the fluid supply tubing 12 may be made of other materials and may be provided in various sizes suitable for providing irrigation water to plants as disclosed herein.

Various connectors 16 are provided to enable connection of the segments of fluid supply tubing 12 to one another in series or in a branching manner. For example, a T-shaped connector 16 enables a branched connection of three segments of fluid supply tubing 12, whereas an L-shaped connector 16 enables connection of two segments of fluid supply tubing 12. Regardless of the shape, the connectors 16 all have a hollow internal passage (not shown) to create a continuous interior flow channel throughout the disclosed device 10.

In the embodiment shown in FIG. 1, hollow T-shaped barbed connectors 16 are used for connecting the segments of fluid supply tubing 12 to form two approximately concentric circles 13 & 14 with three radial segments 15 of fluid supply tubing connecting the outer circle 13 to the inner circle 14, thereby creating a continuous interior flow channel (not shown) within the disclosed device 10. When connected to a water source 23, water is free to flow through the continuous interior flow channel of the fluid supply tubing 12. Although the accompanying Figures illustrate various embodiments of the connectors 16 used to connect the segments of fluid supply tubing 12, one skilled in the art can appreciate that there are many possibilities that exist for connecting the segments of fluid supply tubing 12 (e.g., barbed connectors, compression connectors, etc.) such that the segments of tubing 12 are in fluid communication with one another, all of which are considered to be within the spirit and scope of the present invention.

As depicted in FIG. 7, more than one irrigation device 10 may be supplied by a single water source 23. In one embodiment, a branching connector (e.g., a T-shaped or Y-shaped connector) may be used to connect a water hose 23, which is connected to a water source, to two separate impermeable hoses, which are each connected to a disclosed irrigation device 10. In this manner, water is conveyed from a single water source 23 to two separate irrigation devices 10. In alternative embodiments, a variety of different shaped connectors may be used to supply two or more irrigation devices 10 from a single water source, all of which are considered to be within the spirit and scope of the present invention.

In one of the embodiments contemplated by the present disclosure and depicted in FIGS. 3-7, the outer circle 13 and the inner circle 14 do not form continuous circles (cf. the embodiment depicted in FIG. 1). Rather, the outer circle 13 and the inner circle 14 are interrupted by a break in the respective circles to facilitate placing the device 10 around a plant such as a tree trunk 22 (see FIGS. 5 and 6). The break in the circles, however, does not disrupt the continuous interior flow channel of the device 10. As depicted, the inner circle 14 and the outer circle 13 may be linked at the break by two separate radial segments 15 of fluid supply tubing 12. These two radial segments 15 each use two hollow L-shaped connectors 16 to connect each radial segment 15 to the outer circle 13 and to the inner circle 14 where the circles are interrupted by the break. As shown in FIGS. 3-7, this break allows the device 10 to be manipulated to either an open position (see FIGS. 4-5) or a closed position (see FIGS. 3, 6 and 7). This feature allows the device 10 to be wrapped around the trunk of a tree 22 to provide 360-degree hydration to the area within the immediate vicinity of the tree 22.

Figure 3:
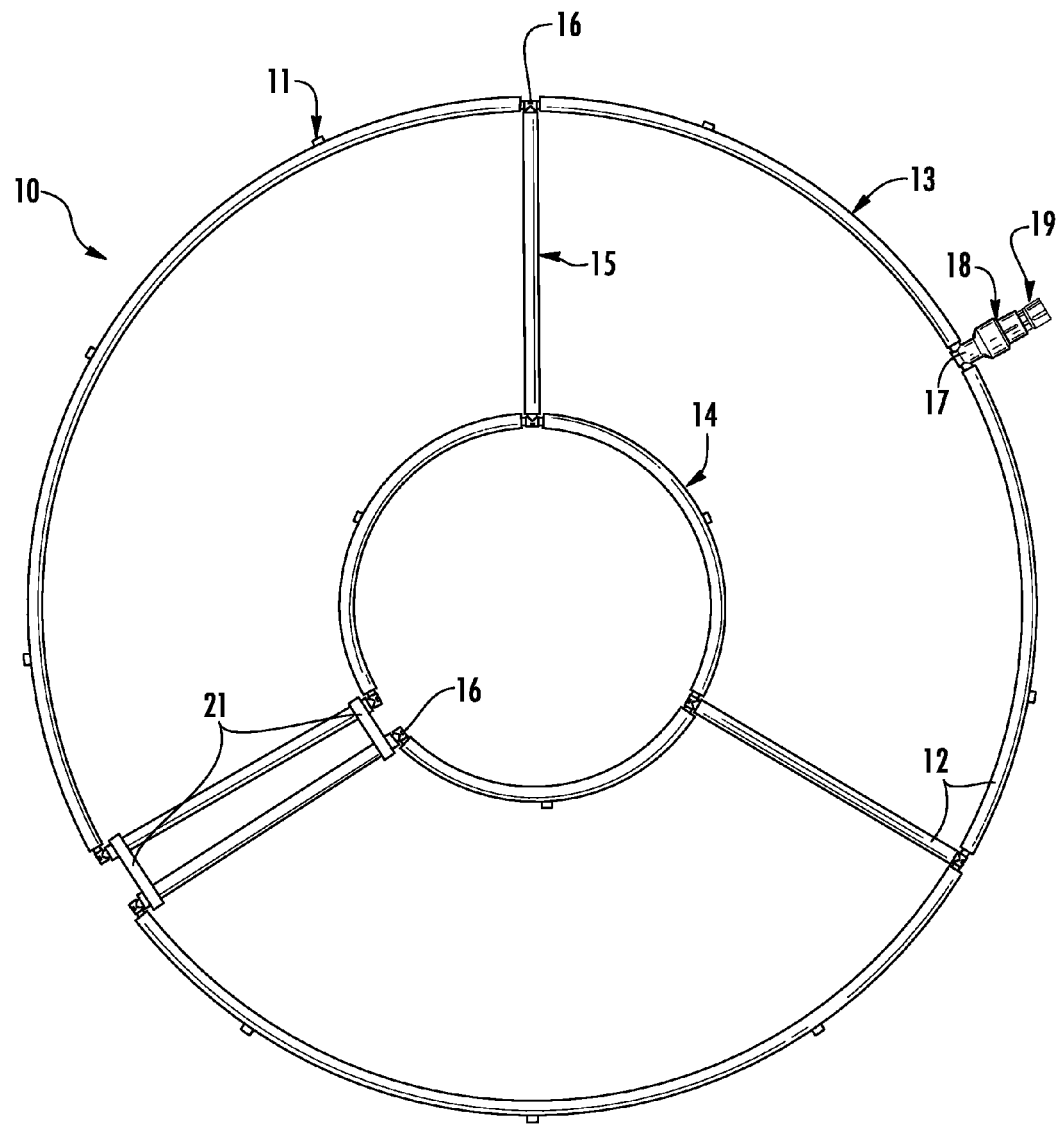
FIG. 3 is a plan view of an alternative embodiment of a device constructed in accordance with the teachings of the present disclosure.
Figure 4:
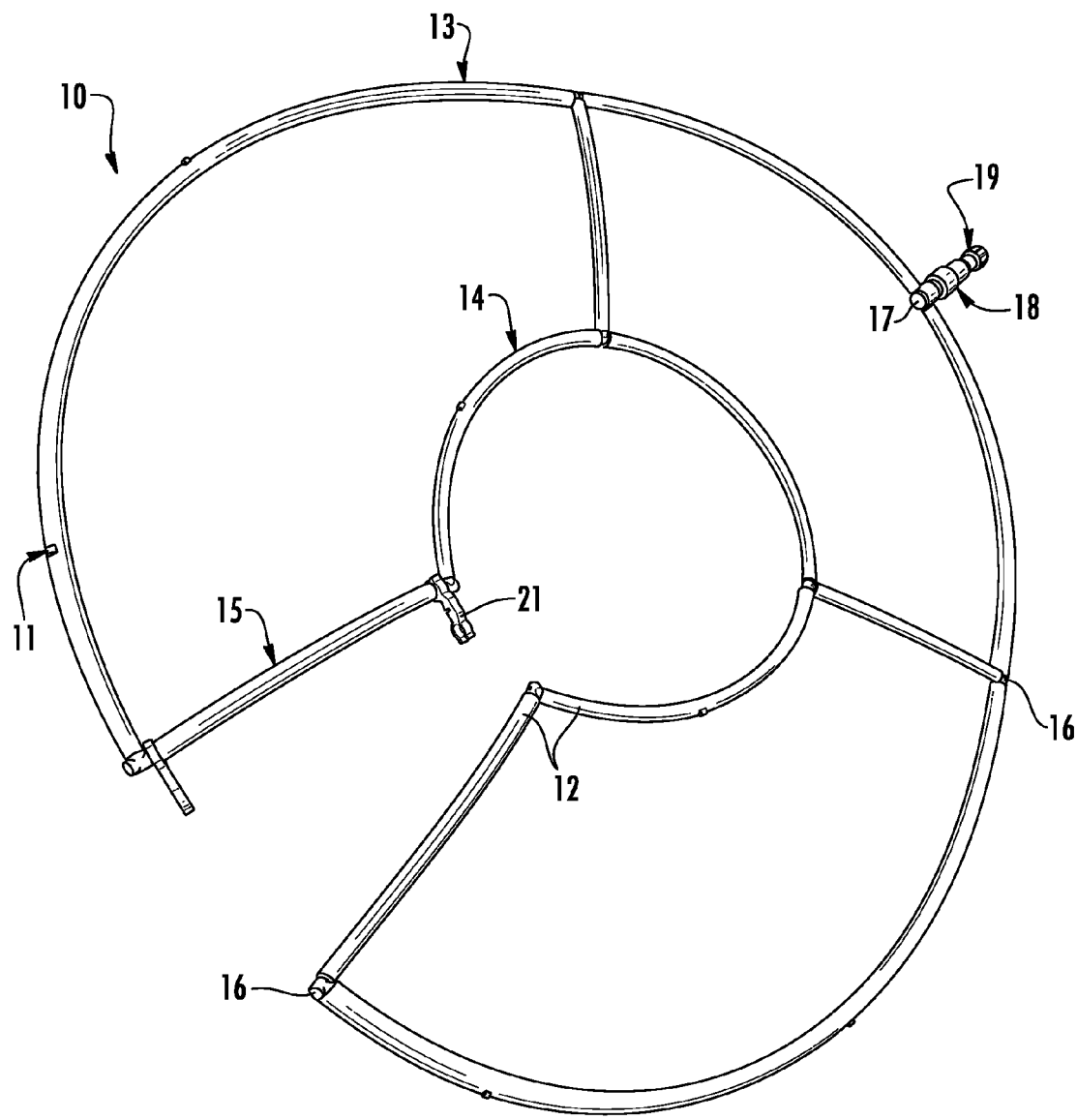
FIG. 4 is a perspective view of the device shown in FIG. 3, with the device in an open position.
Figure 5:
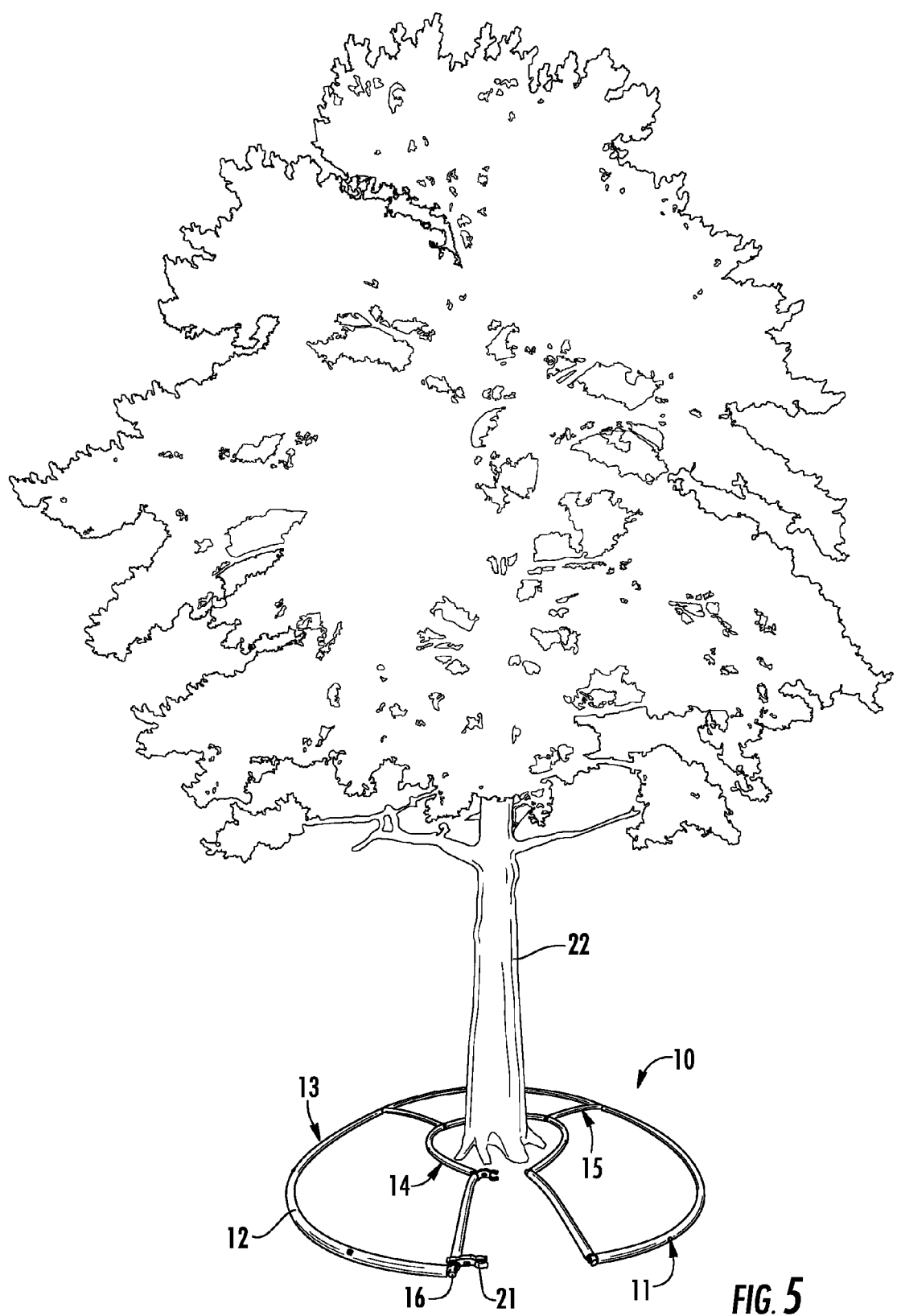
FIG. 5 is a perspective view of the device shown in FIG. 3 encircling a tree trunk, with the device in an open position.

In the closed position, the two separate radial segments 15 are releasably connected to one another by one or more couplings 21 (see FIG. 3). The couplings 21 may be disconnected from the radial segments 15 to release the device 10 to the open position (see FIGS. 4 and 5). One skilled in the art can appreciate that there are numerous embodiments that exist for the couplings 21 used for releasably connecting and disconnecting the tubing between the open and closed positions, all of which are considered to be within the spirit and scope of the present invention.

As illustrated in FIG. 7, the disclosed device 10 is not always intended to encircle a tree trunk 22. For large trees or groupings of trees, for example, a user can simply use the device 10 by watering beneath the dripline of the tree or trees in three approximately evenly-spaced areas beneath the dripline. For example, if the area beneath the dripline of a tree is visualized as the face of a clock, the disclosed irrigation device 10 could be moved from the 10 o'clock position, to the 2 o'clock position, and then to the 6 o'clock position, to represent the three approximately evenly-spaced areas beneath the dripline. In this manner, the device 10 can provide water to the entire root zone of a large tree or grouping of trees. Additionally, the disclosed irrigation device 10 can be placed directly on top of dry and discolored "hot spots" in the grass, in or around flower beds, near shrubs, and near or around any other plant in need of targeted and controlled irrigation.

As illustrated in the accompanying Figures, the segments of fluid supply tubing 12 include a plurality of emitter elements 11 disposed along the tubing 12 at predetermined intervals. The periodic emitter elements 11 may be affixed through the tubing wall or spaced apart within the tubing for emitting water to the soil beneath and surrounding the disclosed device 10. In the embodiments shown in the accompanying Figures, the emitter elements 11 are affixed through the tubing wall along the segments of fluid supply tubing 12 configured to form the two approximately concentric circles 13 & 14. The radial segments 15 of fluid supply tubing generally do not include emitter elements 11 therealong since the radial segments 15 are intended to simply provide a pathway for fluid communication between the outer circle 13 and the inner circle 14.

Figure 2:
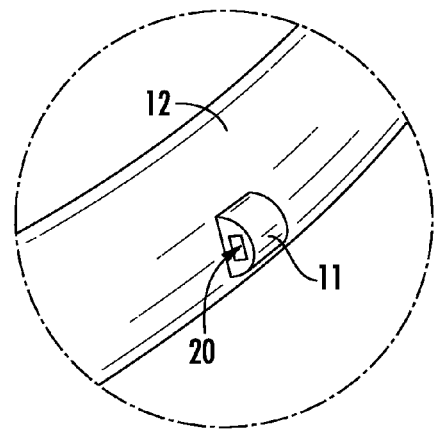
FIG. 2 is a magnified partial view of FIG. 1, showing an emitter element.

A final pressure drop and control of the water flow rate is accomplished in the emitter elements 11. FIG. 2 shows one embodiment of an emitter element 11 that may be used with the disclosed device 10. The hemisphere-shaped emitter element 11 illustrated in FIG. 2 has an internal passage (not shown) for receiving water from the fluid supply tubing 12 and has external passages 20 to emit the water to soil or nearby plants. The passages of the emitter element 11 depicted in FIG. 2 are formed in the shape of a "T" with a single fluid inlet internal passage and two lateral fluid discharge external passages 20 to reduce the flow speed of the water emitting to the soil or nearby plants. The T-shaped passage also tends to minimize the potential for clogging or obstruction of the fluid flow path. In alternative embodiments, the emitter elements 11 may be provided with passages formed in any flow pattern suitable for providing a fluid discharge path that decreases the flow rate to a desired rate. Those skilled in the art will recognize that many variations of emitter elements 11 may be utilized with the disclosed device 10 (e.g., internal emitters, external emitters, emitters of various shapes and having various flow patterns, etc.), as the various embodiments of the present invention are not limited to the use of any particular emitter element.

As can be seen in FIG. 1, the emitter elements 11 may be disposed along the side wall of the tubing 12 facing outward. In this configuration, the emitter elements 11 spray water parallel to and along the side of the tubing 12. Water sprays along the tubing walls and drips down from the tubing 12 to the soil below, watering the soil evenly from the center of the device to several inches surrounding the circumference of the outer circle 13 of the device. In this manner, the soil beneath and around the device 10 is slowly and evenly watered to an ideal moisture level as water slowly moves throughout the soil by capillary action.

The disclosed irrigation device 10 delivers a slow, precise application of water directly to the root zones of plants in a predetermined pattern allowing water to be absorbed slowly into the soil and directly into the root zone of nearby plants. For example, in one embodiment the device 10 delivers approximately 44 gallons of water per hour or 0.733 gallons of water per minute, wherein the outer circle 13 has a diameter of approximately four feet, the inner circle 14 has a diameter of approximately one and a half feet, ½-inch diameter plastic fluid supply tubing 12 is used, pressure regulating emitter elements 11 that emit four gallons of water per hour are used, eight emitter elements 11 are spaced along the outer circle 13 and three emitter elements 11 are spaced along the inner circle 14, and a 10 psi pressure regulation device is used. In this configuration, the soil beneath the device is evely watered from the center of the device to approximately six to eight inches surrounding the device. By using such a slow and controlled water flow rate, the device 10 is able to provide targeted areas with an ideal level of soil moisture.

It is important to note that the construction and arrangement of the elements of the irrigation device provided herein are illustrative only. Although only a few exemplary embodiments of the present invention have been described in detail in this disclosure, those skilled in the art who review this disclosure will readily appreciate that many modifications are possible in these embodiments (such as variations in orientation of the components of the system, sizes, structures, shapes and proportions of the various components, etc.) without materially departing from the novel teachings and advantages of the invention.

Though the disclosed irrigation device is illustrated in the accompanying Figures with its application for use with trees, note that it is not intended to limit the spirit and scope of the present invention solely for use in conjunction with trees. The disclosed device may be utilized to water any plant in need of targeted irrigation and the irrigation device may be used in a wide range of applications including residential, agricultural or commercial applications.

Many other uses of the present invention will become obvious to one skilled in the art upon acquiring a thorough understanding of the present invention. Once given the above disclosures, many other features, modifications and variations will become apparent to the skilled artisan in view of the teachings set forth herein. Such other features, modifications and variations are, therefore, considered to be a part of this invention, the scope of which is to be determined by the following claims.

The invention claimed is:

1. An irrigation device for delivering water from a water source to root zones of one or more plants, comprising:
   an adapter configured to be connected to said water source;
   a pressure regulation device connected to said adapter;
   segments of fluid supply tubing in fluid communication with said pressure regulation device, said segments of fluid supply tubing being configured to form two approximately concentric circles, wherein said two circles form an outer circle and an inner circle, and wherein said outer circle is in fluid communication with said inner circle via one or more radial segments of fluid supply tubing connecting said outer circle to said inner circle; and
   a plurality of emitter elements disposed along said segments of fluid supply tubing at predetermined intervals;
   wherein said inner circle and said outer circle include a break in the respective circles, and wherein the break in the inner circle is connected to the break in the outer circle by two separate radial segments of fluid supply tubing.

2. The device according to claim 1, wherein a continuous interior flow channel exists throughout said segments of fluid supply tubing.

3. The device according to claim 1, further comprising at least one coupling arranged and configured to releasably couple said two separate radial segments of fluid supply tubing to one another.

4. The device according to claim 3, wherein said device is placed in an open position by detaching said at least one coupling from one of the two separate radial segments of fluid supply tubing.

5. The device according to claim 3, wherein said device is used for a deep-root tree watering method, said method comprising the following steps:

connecting said adapter of the device to said water source;
detaching the at least one coupling from one of the two separate radial segments of fluid supply tubing;
positioning the device so that it wraps around a trunk of a tree;
reattaching said at least one coupling to both of the two separate radial segments of fluid supply tubing to connect the two separate radial segments of fluid supply tubing; and
turning on said water source and watering said tree a desired amount.

6. An irrigation device for delivering water from a water source to root zones of one or more plants, comprising:
   an adapter configured to be connected to said water source;
   segments of fluid supply tubing in fluid communication with said water source, said segments of fluid supply tubing being configured to form two approximately concentric shapes, wherein said two concentric shapes form an outer shape and an inner shape, and wherein said outer shape is in fluid communication with said inner shape via one or more radial segments of fluid supply tubing connecting said outer shape to said inner shape; and
   wherein said inner shape includes a gap in the fluid supply tubing forming said inner shape, and wherein said outer shape includes a gap in the fluid supply tubing forming said outer shape, and wherein the gap in the inner shape is connected to the gap in the outer shape by two separate radial segments of fluid supply tubing.

7. The device according to claim 6, further comprising a plurality of emitter elements disposed along said segments of fluid supply tubing.

8. The device according to claim 7, wherein said emitter elements are affixed through the segments of fluid supply tubing configured to form said two approximately concentric shapes.

9. The device according to claim 7, wherein each of said emitter elements is defined as a hemisphere-shaped emitter element including a T-shaped passage having a single fluid inlet internal passage for receiving water from the fluid supply tubing and having two lateral fluid discharge external passages for emitting the water from the fluid supply tubing.

10. The device according to claim 6, wherein connectors are used to connect the segments of fluid supply tubing to one another, and wherein said connectors include a hollow internal passage to create a continuous interior flow channel throughout said device.

11. The device according to claim 6, further comprising a pressure regulation device connected to said adapter.

12. The device according to claim 11, wherein a hollow T-shaped barbed connector connects said pressure regulation device to two segments of said fluid supply tubing, thereby providing for a two-directional flow of water throughout said irrigation device.

13. The device according to claim 11, wherein said pressure regulation device reduces incoming water pressure to a pressure of 10 pounds per square inch.

14. The device according to claim 6, further comprising two said irrigation devices, wherein said water source is a water hose connected to a water faucet and wherein a branching connector connects said water hose to two separate impermeable hoses that are each connected to one of said two irrigation devices.

* * * * *